United States Patent
Rydström et al.

(10) Patent No.: US 12,012,143 B2
(45) Date of Patent: Jun. 18, 2024

(54) ELECTRIFIED TRAILER WITH REVERSE ASSIST FUNCTION

(71) Applicant: Volvo Truck Corporation, Gothenburg (SE)

(72) Inventors: Mats Rydström, Billdal (SE); Lena Larsson, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 291 days.

(21) Appl. No.: 17/717,332

(22) Filed: Apr. 11, 2022

(65) Prior Publication Data

US 2022/0355860 A1   Nov. 10, 2022

(30) Foreign Application Priority Data

May 7, 2021   (EP) ..................... 21172652

(51) Int. Cl.
  *B62D 13/06*   (2006.01)
  *B62D 13/00*   (2006.01)
  *B62D 59/04*   (2006.01)

(52) U.S. Cl.
  CPC ........... *B62D 13/06* (2013.01); *B62D 13/005* (2013.01); *B62D 59/04* (2013.01)

(58) Field of Classification Search
  CPC ...... B62D 13/06; B62D 13/005; B62D 59/04; B62D 13/00; B62D 53/00; B60W 10/08; B60W 10/20; B60W 30/18036
  See application file for complete search history.

(56) References Cited

U.S. PATENT DOCUMENTS

| 10,518,831 B2 | 12/2019 | Wright |
| 2012/0245796 A1 | 9/2012 | Yu et al. |
| 2019/0225286 A1* | 7/2019 | Schutt ..................... G01L 1/142 |

(Continued)

FOREIGN PATENT DOCUMENTS

WO   2018162030 A1   9/2018

OTHER PUBLICATIONS

Pacejka, H., "Tire and vehicle dynamics," 2012, Elsevier Ltd., 629 pages.

(Continued)

*Primary Examiner* — Xiao En Mo
(74) *Attorney, Agent, or Firm* — Withrow & Terranova, PLLC

(57) ABSTRACT

A method for reversing an articulated vehicle comprising a tractor and one or more towed vehicle units, the method comprising arranging an electrified trailer (e-trailer) comprising one or more electric machines (EMs) and a steering function as a rearmost towed vehicle unit of the articulated vehicle, obtaining a reversal command indicative of a desired reversal maneuver by the articulated vehicle, configuring the e-trailer in a reverse towing mode of operation, wherein the e-trailer uses the one or more EMs and the steering function to reverse according to the reversal command while towing the tractor and any further trailer units of the articulated vehicle, configuring the tractor and the further trailer units of the articulated vehicle in a passive towed mode of operation, wherein the tractor and the further trailer units are towed by the e-trailer, and reversing the articulated vehicle by issuing the reversal command to the e-trailer.

11 Claims, 5 Drawing Sheets

(56) References Cited

U.S. PATENT DOCUMENTS

2020/0062239 A1\* 2/2020 Layfield .......... B60W 30/18036
2020/0238990 A1\* 7/2020 Ma ....................... B60W 30/18
2021/0053619 A1 2/2021 Sasu

OTHER PUBLICATIONS

Extended European Search Report for European Patent Application No. 21172652.6, mailed Oct. 26, 2021, 8 pages.

\* cited by examiner

ELECTRIFIED TRAILER WITH REVERSE ASSIST FUNCTION

RELATED APPLICATIONS

The present application claims priority to European Patent Application No. 21172652.6, filed on May 7, 2021, and entitled "ELECTRIFIED TRAILER WITH REVERSE ASSIST FUNCTION," which is incorporated herein by reference in its entirety.

FIELD OF THE INVENTION

The present disclosure relates primarily to heavy-duty vehicles, such as trucks and semi-trailer vehicles, although the techniques disclosed herein can also be used in other types of vehicles. The disclosure relates in particular to electrified trailer vehicles comprising means for propulsion and steering.

BACKGROUND

A semitrailer vehicle normally comprises a tractor arranged to tow a trailer unit via a fifth wheel connection. A dolly vehicle unit can also be added to the vehicle combination, which allows for additional trailer units to be towed by the same tractor, thereby extending the cargo transport capability of the vehicle combination. A drawback associated with heavy-duty vehicles comprising more than one trailer unit is that they are notoriously difficult to manoeuvre and require strong tractors to provide the necessary propulsion torque for towing the plurality of trailer units.

A traditional dolly vehicle unit is a passive (unpowered) vehicle unit designed for connection to a tractor unit, truck, or prime mover vehicle with strong traction power. However, electrified dolly vehicles have been proposed in order to improve vehicle energy efficiency, traction power and manoeuvrability. WO 2018/162030 discloses one interesting example use of such electrified dolly vehicles. U.S. Pat. No. 10,518,831 describes another example of an electrified dolly vehicle unit.

Electrified trailers have also been proposed in order to improve vehicle propulsion and manoeuvrability, see, e.g., US 2021/0053619, which discloses an electrified trailer unit with a steerable wheel axle which can be used to negotiate sharp turns and to assist in reversing the vehicle up to a warehouse dock and the like. US2020/238990 also discloses a trailer arranged to improve vehicle propulsion and manoeuvrability.

However, despite the advancements made to date, there is a need for further improvements in the field in order to realize the full potential of self-powered towed vehicles. It is furthermore desired to develop control methods for electrically powered vehicle units which are associated with a reduced computational complexity, such that they can be performed on less powerful processing units and generate more predictable control results.

SUMMARY

It is an object of the present disclosure to provide methods, electrified trailer units and control units for assisting in reversal of heavy-duty vehicles. This object is obtained by a method for reversing an articulated vehicle comprising a tractor and one or more towed vehicle units, the method comprises arranging an electrified trailer (e-trailer) comprising one or more electric machines (EM) and a steering function as a rearmost towed unit of the articulated vehicle, obtaining a reversal command indicative of a desired reversal maneuver by the articulated vehicle, configuring the e-trailer in a reverse towing mode of operation, in which mode the e-trailer is arranged to use the one or more EMs and the steering function to reverse according to the reversal command while towing the tractor and any further trailer units of the articulated vehicle. The method also comprises configuring the tractor and the further trailer units of the articulated vehicle in a passive towed mode of operation, in which mode the tractor and the further trailer units are arranged to be at least partially towed by the e-trailer, and reversing the articulated vehicle by issuing the reversal command to the e-trailer.

This way the e-trailer temporarily assumes the role of towing vehicle during the reversal maneuver. Since traction torque is applied at the rearmost axle (which is now the foremost axle in the reversal direction), the control problem is significantly simplified. In fact, the tractor and any other vehicle units can be placed in a fully passive free-rolling mode, allowing them to be towed by the e-trailer. Alternatively, the towing vehicle unit and other trailer units may assist in the reversal maneuver, while being at least partially towed by the e-trailer. The method allows for reversal of multi-trailer vehicles along narrow roads, which would otherwise have been a very difficult control problem.

The method may be performed in a vehicle control unit (VCU) arranged in the e-trailer, and/or in a VCU arranged in the tractor.

According to aspects, the method comprises generating the reversal command based on manual control input obtained from a driver of the articulated vehicle. This means that the methods can be used to provide driver support, allowing, e.g., an inexperienced human driver to perform reversal maneuvers which have otherwise only been possible to performed by very experienced drivers. Advantageously, the driver may be provided with a heads-up display visualizing a view to the rear as seen from the rearmost trailer unit of the articulated vehicle. The vehicle controls can then be re-configured such that the steering wheel and/or control pedals mimic a forward motion along the road seen in the heads-up display. This way a complicated reversal maneuver can be transformed into a normal forward driving maneuver, which is by far more simple to successfully complete compared to the actual reversal maneuver.

According to aspects, the method comprises generating the reversal command based on control input obtained from an external operator of the articulated vehicle. The disclosed methods can also be used with advantage for remote control of a multi-trailer vehicle. Reversal maneuvers controlled remotely may perhaps be even more difficult to perform in case of a multi-trailer vehicle reversing along a complicated route. By the herein disclosed methods, the control problem is greatly simplified.

According to aspects, the method comprises generating the reversal command automatically by a force generation module in a main vehicle control unit. Thus, advantageously, the methods are compatible with control architectures for advanced driver assistance systems and even for autonomous driving.

According to aspects, the method comprises assisting in reversing the articulated vehicle by applying steering by the tractor to reduce a wheel slip angle associated with the wheels on the tractor, and preferably minimizing the wheel slip angle. A tractor which steers to minimize wheel slip angle may help in the reversal operation, without requiring a control connection between e-trailer and tractor, which is an advantage. The tractor steering control may either be automatic, or manual. In case of manual control, instructions may be provided to the driver indicating which way the driver should steer the tractor during reversal in order to assist the e-trailer in the best way.

According to aspects, the method comprises assisting in reversing the articulated vehicle by applying torque by the tractor to reduce a coupling force at a tractor coupling point, and preferably minimizing the coupling force. Again, the tractor and any intermediate trailer units may assist in the reversal operation by providing some traction force. This can be performed independently of the control performed by the e-trailer, which is an advantage. This way the tractor can passively assist in the reversal operation while still being at least partially towed by the rearmost e-trailer.

According to aspects, the articulated vehicle comprises a further e-trailer and/or a self-powered dolly vehicle unit, and the method may comprise assisting in reversing the articulated vehicle by applying steering by the further e-trailer and/or the dolly to reduce a wheel slip angle associated with the wheels further e-trailer and/or the self-powered dolly vehicle unit, respectively, and preferably minimizing the wheel slip angle. This way the further e-trailer and/or a self-powered dolly vehicle unit can passively assist in the reversal operation while still being at least partially towed by the rearmost e-trailer. The articulated vehicle may furthermore comprise a further e-trailer and/or a self-powered dolly vehicle unit, the method may then comprise assisting in reversing the articulated vehicle by applying torque by the further e-trailer and/or by the dolly to reduce a coupling force at respective trailer or dolly rear coupling points, and preferably minimizing the coupling force.

There is also disclosed herein control units, vehicles, computer readable media, and computer program products associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
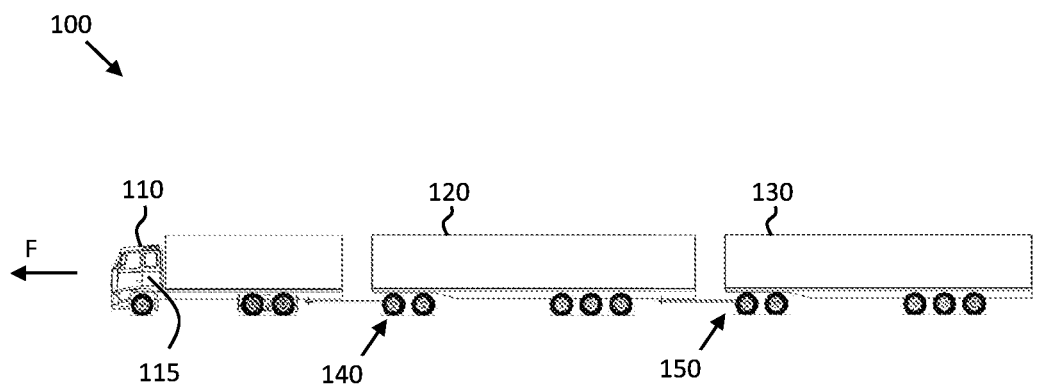
FIG. 1 schematically illustrates an example heavy-duty vehicle combination.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a truck or towing vehicle 110 configured to tow a first trailer unit 120 by use of a first dolly 140 connected to the truck 110 via a drawbar. The connection between the first dolly 140 and first trailer 120 in FIG. 1 comprises a fifth wheel connection in a known manner. To further extend the cargo transport capability of the vehicle combination 100, a second dolly vehicle 150 has been connected to the rear of the first trailer 120. This second dolly vehicle 150 is arranged to tow a second trailer 130. To distribute propulsion over the vehicle combination or road train some of the towed vehicle units 120, 130, 140, 150 can be self-powered, i.e., equipped with power sources and propulsion devices. Both electrified dolly vehicle units and electrified trailer vehicle units are known, as mentioned above.

The example tractor 110 in FIG. 1 also comprises a vehicle control unit (VCU) 115 configured to perform various vehicle control functions, such as vehicle motion management. This control unit is, however, entirely optional in the current context.

Figure 2:
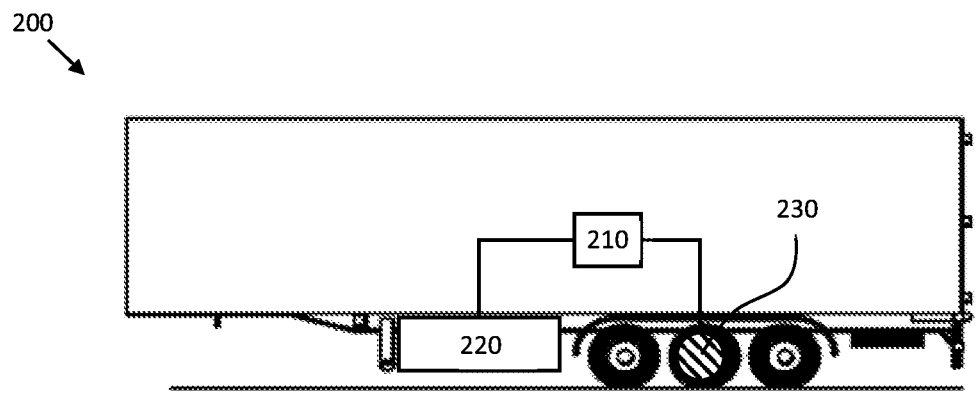
FIG. 2 shows an electrified trailer, or e-trailer.

FIG. 2 illustrates an example electrified trailer, or e-trailer 200. This e-trailer comprises a VCU 210 arranged to control an electric storage system (ESS) 220 and an electrical machine (EM) 230. The ESS 220 may comprise any combination of battery packs and fuel cell stacks. Electrified trailers have been proposed previously, e.g., in US 2021/0053619, where a "computed power control system" is disclosed which performs joint control of trailer and tractor motion support devices (MSD) in order to navigate the trailer up to a warehouse dock. In order to speed up the control of the propulsion devices, the VCU preferably implements a wheel-slip based control methodology instead of the more common torque-based control. This control methodology is particularly beneficial in the context of e-trailers controlled from a VCU 115 in the tractor 110 since the communication delay between tractor VCU 115 and e-trailer VCU 210 may be considerable in some cases. Wheel-slip based control will be discussed in more detail below.

Generally, an e-trailer is an electrically powered vehicle unit primarily intended to be towed by a tractor or main towing vehicle and to carry cargo. Thus, an e-trailer is different from a self-powered dolly vehicle unit which is not arranged to carry any cargo.

Figure 3:
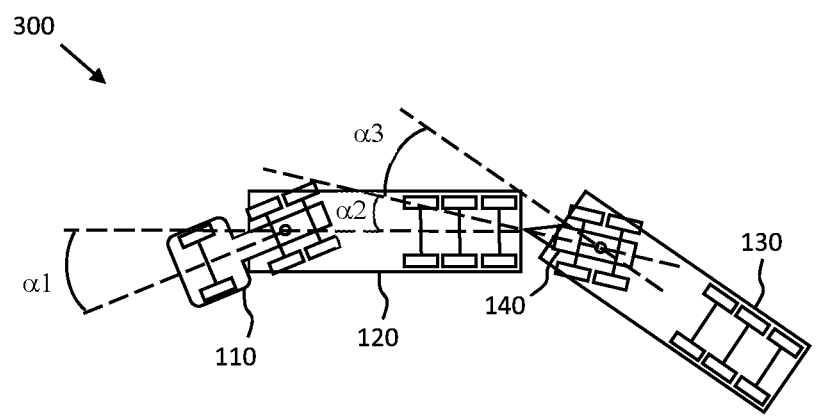
FIG. 3 illustrates reversal of a multi-trailer vehicle.

Reversing multi-trailer vehicle combinations is, as noted above, notoriously difficult, due to the many joints or articulation points involved. FIG. 3 shows an example 300 of reversing a double-trailer vehicle which comprises a tractor 110, a first trailer 120 and a second trailer 130 connected to the first trailer via a dolly 140. The tractor 110 "pushes" the trailer units in front of it while reversing, and can therefore only control articulation angles α1, α2, α3 indirectly by propagating motion via the different towed vehicle units 120, 130, 140. That is, to change the articulation angle α3, the tractor first needs to move the first trailer 120 which in turn moves the dolly 140 to cause a change in the articulation angle α3 between the dolly 140 and the second trailer unit 130. Due to the multiple articulation points in the vehicle 300, even a computer assisted reversal manoeuvre is difficult to complete successfully, in particular if the road is narrow and comprises sharp bends, as can be the case on a gravel road in a forest for instance.

The present disclosure builds on the realization that an electrified trailer, such as that illustrated in FIG. 2, can temporarily assume the role of tractor unit, and instead tow the other trailer units and the tractor during the reversal manoeuvre. This transforms the difficult control problem resulting from reversing multi-trailer vehicles using a tractor 110 which pushes the units into a much simpler control problem where the rearmost trailer acts as prime mover and tows the other vehicle units along the reversal path, i.e., not much different from when the vehicle 100 moves in the forward direction F. The present disclosure expands on the e-trailer concept presented in US 2021/0053619 and proposes an electrified trailer unit which can be used to assist in reversing multi-trailer vehicles for longer distances, e.g., along narrow gravel roads and the like, and which does not require joint control of trailer and tractor MSDs by the advanced "computed power control system" described in US 2021/0053619. Rather, the proposed e-trailer 200 is able to reverse legacy tractor and trailer units which do not comprise any advanced computational resources, simply by configuring the tractor 110 and the further trailer units 120, 140, 150 of the articulated vehicle 100 in a passive towed mode of operation, in which mode the tractor 110 and the further trailer units 120, 140, 150 are arranged to be towed by the e-trailer 200.

Figure 4:
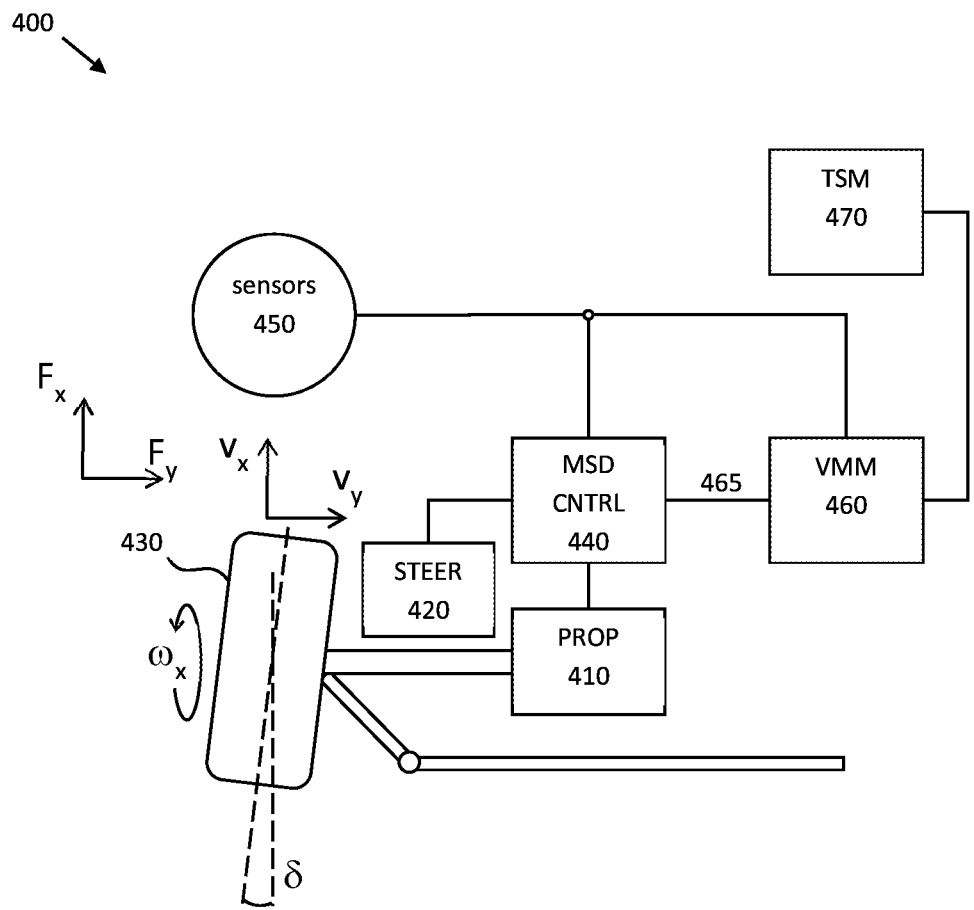
FIG. 4 illustrates a vehicle control function architecture.

FIG. 4 schematically illustrates functionality 400 for controlling a wheel 430, e.g., on an e-trailer, by some example motion support devices (MSDs) here comprising a power steering arrangement 420 and a propulsion device 410 such as an electric machine (EM). The power steering arrangement 420 and the propulsion device 410 are examples of actuators which can be controlled by one or more motion support device control units 440. An MSD control unit 440 may be arranged to control one or more actuators. For instance, it is not uncommon that an MSD control unit is arranged to control MSDs for both wheels of an axle. By estimating vehicle unit motion using, e.g., global positioning systems, vision-based sensors, wheel rotation speed sensors, radar sensors and/or lidar sensors, and translating this vehicle unit motion into a local coordinate system of a given wheel (in terms of, e.g., longitudinal and lateral velocity components), it becomes possible to accurately estimate wheel slip in real time by comparing the vehicle unit motion in the wheel reference coordinate system to data obtained from a wheel rotation speed sensor arranged in connection to the wheel. A traffic situation management (TSM) function 470 plans driving operations with a time horizon of, e.g., 1-10 seconds or so. This time frame corresponds to, e.g., the time it takes for the vehicle 100 to negotiate a curve. The vehicle manoeuvres, planned and executed by the TSM, can be associated with acceleration profiles and curvature profiles which describe a desired vehicle velocity and turning for a given manoeuvre. The TSM continuously requests the desired acceleration profiles $a_{req}$ and curvature profiles $c_{req}$ from a vehicle motion management (VMM) function 460 which performs force allocation to meet the requests from the TSM in a safe and robust manner and communicates requests to the different MSDs. The VMM function 460 manages both force generation and MSD coordination, i.e., it determines what forces that are required at the vehicle units in order to fulfil the requests from the TSM function 470, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

Figure 5:
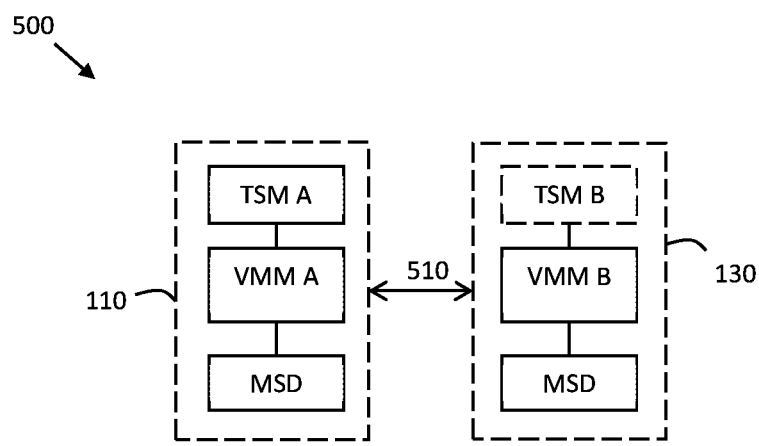
FIG. 5 illustrates a dependency between two vehicle control function stacks.

FIG. 5 illustrates a vehicle control stack in a tractor 110 which is communicatively coupled to a control stack in a trailer unit 130. During reversal of the vehicle 100, an instance of the control stack implemented in the e-trailer 130 may assume control of the vehicle 100. This means that the TSM and VMM functions of the tractor 110 are temporarily placed in a passive towed mode of operation, in which mode the tractor 110 (and any further trailer units) are arranged to be towed by the e-trailer. This mode of operation is preceded by control signaling over the interface 510. This control signaling may comprise, e.g., a request for reversal operation by the e-trailer, followed by an acknowledgement, whereupon the e-trailer control stack assumes command of the reversal operation, and the tractor enters into the passive towed mode where it essentially acts like a towed unit. In this manner, the "order" of the vehicle units in the articulated vehicle 100 is turned around, such that the rearmost trailer unit 130 instead becomes the prime mover for the duration of the reversal maneuver. This way the complexity of the reversal maneuver is reduced significantly since the tractor and the further trailer units then simply "tag along" behind the e-trailer for the duration of the reversal maneuver.

It is appreciated that the concepts disclosed herein are applicable also in the case of a legacy tractor 110 combined with the new type of e-trailer 200 shown in FIG. 2. This legacy tractor is then placed in neutral with disengaged brakes prior to commencement of the reversal operation, whereupon it can be towed just like a passive trailer unit for the duration of the reversal maneuver.

The e-trailer 200 is, as mentioned above, is optionally but preferably controlled based on wheel slip or wheel speed instead of wheel torque which is customary. Longitudinal wheel slip λ may, in accordance with SAE J670 (SAE Vehicle Dynamics Standards Committee Jan. 24, 2008) be defined as $$\lambda = \frac{R\omega_x - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel). Thus, λ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel. An advantage of wheel slip control is that traction is improved on slippery roads.

The VMM 460 and optionally also the MSD control 440 maintains information on $v_x$ (in the reference frame of the wheel), while a wheel speed sensor 450 or the like can be used to determine $\omega_x$ (the rotational velocity of the wheel). In order for a wheel (or tire) to produce a wheel force, slip must occur. For smaller slip values the relationship between slip and generated force are approximately linear, where the proportionality constant is often denoted as the slip stiffness of the tire. A tire 430 is subject to a longitudinal force $F_x$, a lateral force $F_y$, and a normal force $F_z$. The normal force $F_z$ is key to determining some important vehicle properties. For instance, the normal force to a large extent determines the achievable lateral tire force $F_y$ by the wheel since, normally, $F_x \leq \mu F_z$, where $\mu$ is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

In the technical field of vehicle dynamics, slip angle or sideslip angle $\alpha$ is the angle between the direction in which a wheel is pointing and the direction in which it is actually traveling (i.e., the angle between the forward velocity vector $v_x$ and the vector sum of wheel forward velocity $v_x$ and lateral velocity $v_y$. This slip angle results in a force, the cornering force, which is in the plane of the contact patch and perpendicular to the intersection of the contact patch and the midplane of the wheel. The cornering force increases approximately linearly for the first few degrees of slip angle, then increases non-linearly to a maximum before beginning to decrease.

The slip angle, $\alpha$ is defined as $$\alpha = \arctan\left(\frac{v_y}{|v_x|}\right)$$

Figure 6:
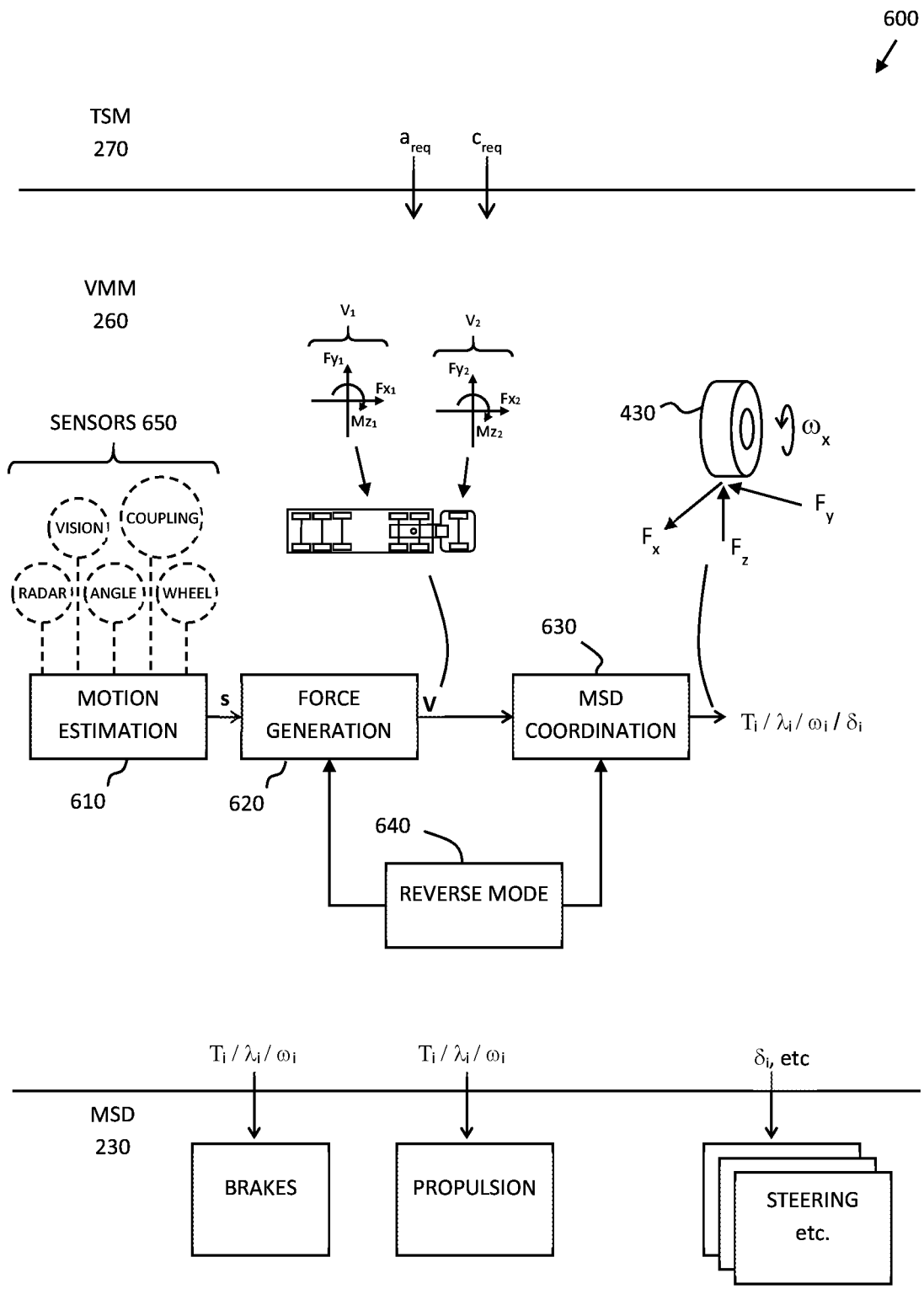
FIG. 6 illustrates a vehicle control function architecture.

With reference also to FIG. 6, the VMM function 460 operates with a time horizon of about 1 second or so, and continuously transforms the acceleration profiles $a_{req}$ and curvature profiles $c_{req}$ into control commands for controlling vehicle motion functions, actuated by the different MSDs 410, 420 of the vehicle 100 which report back capabilities to the VMM, which in turn are used as constraints in the vehicle control. The VMM function 460 performs vehicle state or motion estimation 610, i.e., the VMM function 460 continuously determines a vehicle state s comprising positions, speeds, accelerations, and articulation angles of the different units in the vehicle combination by monitoring operations using various sensors 650 arranged on the vehicle 100, often but not always in connection to the MSDs. Of particular importance to the present concepts are coupling force sensors and sensors capable of providing information from which wheel sideslip, i.e., slip angle, can be determined.

The result of the motion estimation 610, i.e., the estimated vehicle state s, is input to a force generation module 620 which determines the required global forces $V=[V_1, V_2]$ for the different vehicle units to cause the vehicle 100 to move according to the requested acceleration and curvature profiles $a_{req}$, $c_{req}$. The required global force vector V is input to an MSD coordination function 630 which allocates wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100.

By determining vehicle unit motion using, e.g., global positioning systems, vision-based sensors, wheel speed sensors, radar sensors and/or lidar sensors, and translating this vehicle unit motion into a local coordinate system of a given wheel 430 (in terms of, e.g., longitudinal and lateral velocity components), it becomes possible to accurately estimate wheel slip and slip angle in real time by comparing the vehicle unit motion in the wheel reference coordinate system to data obtained from the wheel speed sensor arranged in connection to the wheel.

The e-trailers disclosed herein are advantageously controlled based on wheel slip $\lambda$ or wheel speed $\omega$ instead of wheel torque T as is more common, primarily since this allows a faster control with less latency. A tire model can be used to translate between a desired longitudinal tire force for a given wheel and an equivalent wheel slip $\lambda$ for the wheel. Wheel slip $\lambda$ relates to a difference between wheel rotational velocity and speed over ground and will be discussed in more detail below. Wheel speed $\omega$ is a rotational speed of the wheel, given in units of, e.g., rotations per minute (rpm) or angular velocity in terms radians/second (rad/sec) or degrees/second (deg/sec). A tire model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tire models. See, e.g., chapter 7 where the relationship between wheel slip and longitudinal force is discussed.

The interface 465 between VMM and MSDs capable of delivering torque to the vehicle's wheels has, traditionally, been focused on torque-based requests to each MSD from the VMM without any consideration towards wheel slip. However, this approach has significant performance limitations. In case an excessive slip situation arises, which may very well happen during a reversal maneuver of a heavily laden vehicle combination, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different VCUs, the latencies involved in the communication between them significantly limits the slip control performance. Moreover, the related actuator and slip assumptions made in the two VCUs that are used to achieve the actual slip control can be inconsistent and this in turn can lead to sub-optimal performance Significant benefits can be achieved by instead using a wheel speed or wheel slip based request on the interface 465 between VMM and the MSD controller 440 on the e-trailer, thereby shifting the difficult actuator speed control loop to the MSD controllers, which generally operate with a much shorter sample time compared to that of the VMM function 460. Such an architecture can provide much better disturbance rejection compared to a torque-based control interface and thus improves the predictability of the forces generated at the tire road contact patch.

The present disclosure introduces a reverse mode function 640 into the overall control architecture of the vehicle 100. As mentioned above, vehicle reversal comprising joint control of tractor motion support devices and e-trailer propulsion and steering is a relatively complicated control task which often requires significant processing resources, i.e., high-power on-board computers. The reversal techniques proposed herein is to instead arrange an e-trailer as the rearmost towed unit, and let this rearmost trailer assume the role of prime mover for the duration of the reversal maneuver. The other vehicle units are then placed in a passive mode of operation, where they assume roles of towed vehicle units. Thus, with reference to FIG. 2 and FIG. 4, there is disclosed an e-trailer 200 comprising one or more EMs 410 and a steering function 420, where the e-trailer comprises a VCU 210 arranged to control the e-trailer in a reverse towing mode of operation, in which mode the e-trailer is configured to use the one or more EMs and the steering function to reverse according to a reversal command.

Figure 7:
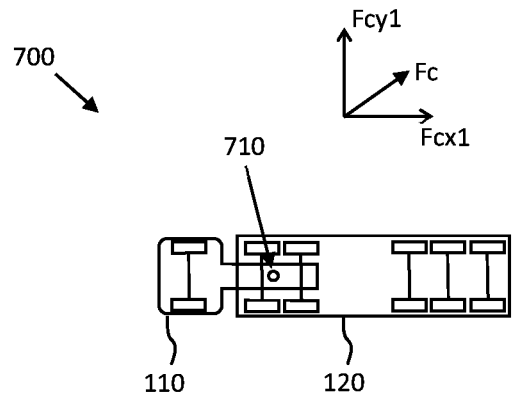
FIGS. 7-8 show example vehicle coupling forces.
Figure 8:
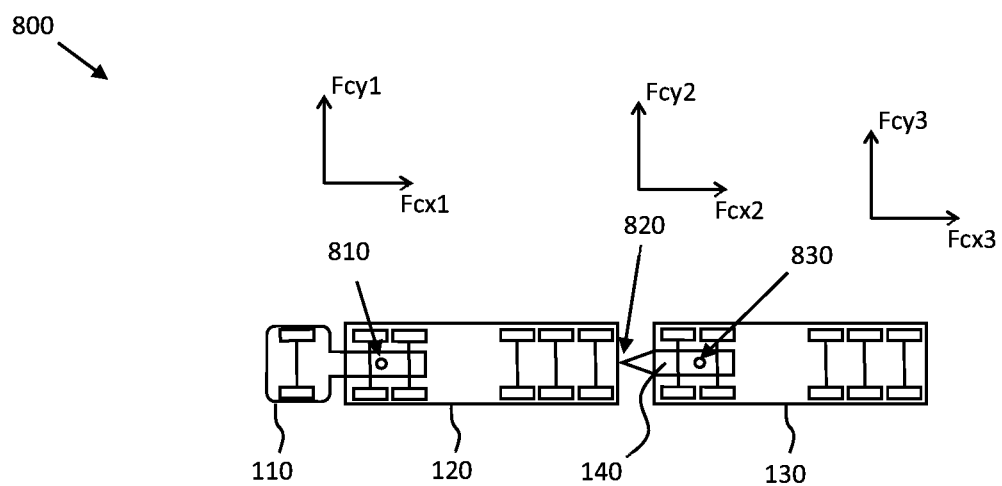

It has been realized that the vehicle units towed in this manner during the reversal maneuver may passively assist in the reversal without complicating the control problem, i.e., while still operating in a passive towed configuration. FIG. 7 illustrates an articulated vehicle 700 comprising a tractor 110 and a single trailer 120 which is an e-trailer such as that shown in FIG. 2 above. The tractor 110 may be configured to determine a coupling force vector Fc (here in two dimensions Fcy1, Fcy2, although three-dimensional coupling force control is of course also possible) having a magnitude and a direction, and which acts on the coupling point 710 between tractor 110 and trailer 120. The tractor 110 may then apply a limited amount of propulsion in order to reduce the magnitude of the coupling force at the coupling point 710, and preferably minimize the coupling force. If performed correctly, the e-trailer will not notice that the tractor 110 is there, and simply maneuver independently according to the reversal command, which may, e.g., comprise an instruction to follow a given path or to meet an acceleration and curvature request. This motion control by the tractor 110 can, e.g., be realized by a control function such as that discussed above in connection to FIG. 6. Notably, this type of reverse assist does not require joint control of the tractor and trailer, since it is still the e-trailer which is towing the tractor, although the tractor helps out some in generating propulsion force to reduce the towing burden on the e-trailer. This brings the advantage of reducing the torque requirements imposed on the e-trailer and/or allows for a larger gross vehicle weight (GCW). The concept can of course also be extended to multi-trailer vehicles 800, which comprises more than one e-trailer, and or one or more self-powered dolly vehicle units, as illustrated in FIG. 8. Each self-powered vehicle unit can then be configured to independently apply propulsion to reduce the coupling force magnitude with respect to the next towed vehicle unit rearward from the given vehicle unit. For instance, in FIG. 8, the tractor 110 acts to reduce coupling forces at the coupling point 810, the first trailer unit 120 acts to reduce coupling forces at the coupling point 820, the dolly vehicle unit acts to reduce coupling forces at the coupling point 830, and so on.

Thus, FIG. 7 and FIG. 8 illustrate aspects of a tractor 110 comprising a VCU arranged to configure the tractor 110 in a passive towed mode of operation, in which mode the tractor 110 is arranged to be towed by an e-trailer 200, where the VCU is arranged to control a steering angle δ to reduce a wheel slip angle associated with two or more steered wheels on the tractor 110 when in the passive towed mode of operation. There is also disclosed herein a tractor 110 comprising a VCU arranged to configure the tractor 110 in a passive towed mode of operation, in which mode the tractor 110 is arranged to be towed by an e-trailer 200, where the VCU is arranged to assist in reversal of an articulated vehicle comprising the tractor by applying propulsion by the tractor 110 to reduce a coupling force at a tractor coupling point 710, 810.

Figure 9:
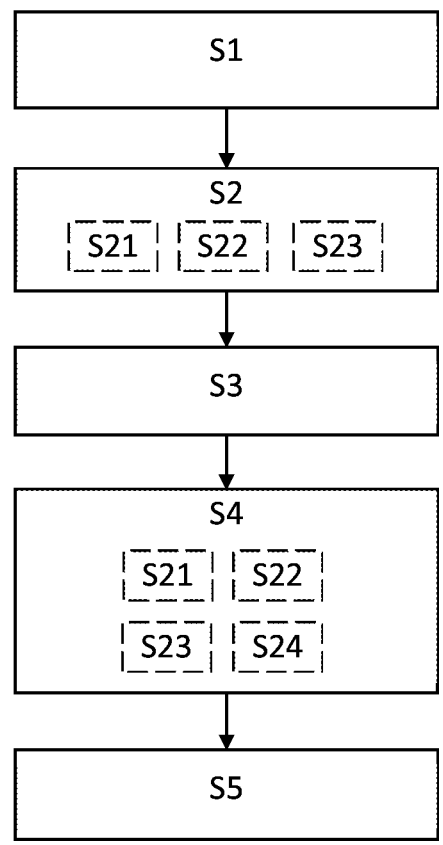
FIG. 9 is a flow chart illustrating methods.

To summarize the proposed e-trailer concept, FIG. 9 illustrates a method for reversing an articulated vehicle 100, 300 comprising a tractor 110 and one or more towed vehicle units 120, 130, 140, 150. The method comprises arranging S1 an e-trailer 200 comprising one or more electric machines (EM) 410 and a steering function 420 as a rearmost towed unit 130 of the articulated vehicle. The e-trailer 200 was discussed above, e.g., in connection to FIG. 2. It is appreciated that the e-trailer can be comprised in a global vehicle control system, where a VCU 210 on the vehicle normally acts in slave mode to a main vehicle controller, as discussed in connection to FIG. 5 above. However, the e-trailer can also be combined with legacy tractor vehicle units which do not comprise any form of advanced computerized motion control functionality. The steering function of the e-trailer can be configured in different ways. For instance, a steered axle may be arranged on the e-trailer which allows the e-trailer to maneuver with relative agility. However, a fixed axle is also possible, in which case the steering function can instead be realized by application of different wheel forces on the two sides of the e-trailer.

The method also comprises obtaining S2 a reversal command indicative of a desired reversal maneuver by the articulated vehicle 100, 300, 700, 800. This reversal command may, e.g., be a control signal from a remote-control device managed by a driver from the cabin of the tractor 110, or from a location external to the vehicle 100. For instance, a driver or operator may exit the tractor and reverse the vehicle from a location remote, which allows a better view of the reversal process. The reversal command may also be generated automatically by connecting a TSM function 470 operating on a control unit in the prime mover 110 to a VMM function implemented on the e-trailer. The VMM function on the e-trailer then assumes the role of the VMM function on the tractor 110, allowing the vehicle to be reversed by using the e-trailer as prime mover instead of the tractor. Again, this simplifies the solution to the control problem which must be solved in order to complete the reversal operation.

As discussed above, the e-trailer is configurable S3 in a reverse towing mode of operation, in which mode the e-trailer is arranged to use the one or more EMs and the steering function to reverse according to the reversal command while towing the tractor 110 and any further trailer units 120, 140, 150 of the articulated vehicle. The tractor 110 and the further trailer units 120, 140, 150 of the articulated vehicle are instead configured S4 in a passive towed mode of operation, in which mode the tractor 110 and the further trailer units 120, 140, 150 are arranged to be at least partly towed by the e-trailer. This way even multi-trailer articulated vehicles can be reversed S5 along complex routes and on narrow roads without solving complex control problems, simply by issuing the reversal command to the e-trailer which will then assume the role of prime mover and tow the other vehicle units during the reversal maneuver.

The methods discussed herein may be performed by the vehicle control unit (VCU) 210 arranged in the e-trailer 200, and/or by the VCU 115 arranged in the tractor 110. If the method is performed by the VCU 210 in the e-trailer, then no advanced computer support is required in the tractor 110. If instead the methods are performed in the tractor VCU 115, then the computational control burden is significantly reduced due to the fact that the e-trailer has assumed the role of prime mover, which in turn means that the difficult control problem discussed above in connection to FIG. 3 no longer is relevant.

The method optionally comprises generating S21 the reversal command based on manual control input obtained from a driver of the articulated vehicle. This manual control input may be input by the driver via some form of display or via the regular steering wheel. In case the steering wheel is used, a display may advantageously be configured in the cabin to show a rearward view as seen from the rearmost trailer. The driver then uses the normal vehicle control commands, i.e., steering wheel and pedals, to control the vehicle along the path of the reversal maneuver. The method may also comprise generating S22 the reversal command based on control input obtained from an external operator of the articulated vehicle. This external operator may be located remote from the vehicle and use a remote-control device to control the e-trailer via wireless link. This may be easier in particularly challenging reversal scenarios, since the operator may move around to get a better view of the surroundings of the vehicle 100. The external operator may also be located in a control tower or in connection to a loading bay at a warehouse or logistics facility.

A heads-up display or other form of visual support may be provided in the cabin to assist the driver in the reversing. This display means can then show a view seen from the rearmost trailer unit. The driver input controls, or the controls of the remote controller, can then be reconfigured so as to control the traction and steering of the trailer, as if this steered axle was the front-most axle on the vehicle. Thus, the driver can simply steer the articulated vehicle during the reversal operation just like if the reversal operation was a normal forward driving operation. In other words, depressing the gas pedal will increase the rearward velocity, turning the steering wheel left will cause the rearmost vehicle unit to steer to the left in the direction of reversal, and turning the steering wheel to the right will cause the rearmost vehicle unit to steer to the right in the direction of reversal. This reversal operation may be associated with a limit on vehicle velocity, in order to ensure safe reversal operation.

According to aspects, the method optionally comprises generating S23 the reversal command automatically by a force generation module 620 in a main vehicle control unit 115. This force generation module then faces a simpler control problem, since it suffices to control the e-trailer along the path of reversal whereupon the other vehicle units will be towed along the path by the e-trailer.

The method may also comprise assisting S41 in reversing the articulated vehicle by applying steering by the tractor 110 to reduce a wheel slip angle associated with the wheels on the tractor 110, and preferably minimizing the wheel slip angle. Any wheel slip angle is indicative of an incorrect wheel angle, since the desired "tag along" configuration of all vehicle units except for the rearmost e-trailer is to just follow the vehicle in front along the path of reversal. Controlling steering based on slip angle represents a low complexity method for controlling steering angle which can be performed independently by the different vehicle units, without requiring, e.g., a complex computed power control system as disclosed in US 2021/0053619 which performs joint control of trailer and tractor motion support devices (MSD) in order to navigate the vehicle along a reversal path.

According to other aspects, the method also comprises assisting S42 in reversing the articulated vehicle by applying torque by the tractor 110 to reduce a coupling force magnitude at a tractor coupling point 710, 810, and preferably minimizing the coupling force. The reduction of coupling force magnitude can also be performed independently by the different vehicle units, thereby avoiding complex joint control of the different units in a multi-trailer vehicle combination. A coupling force sensor can be mounted in connection the different articulation points on the vehicle 100 and separate vehicle control units can be configured to apply wheel force to reduce this coupling force. The coupling force sensors may advantageously be combined with articulation angle sensors. These articulation angle sensors then provide an indication of the articulation angle, which simplifies the force generation to reduce the coupling force magnitude. In a very simple implementation of this coupling force reduction feature, the trailer units simply apply traction force in case the articulation angle is below a given magnitude, i.e., as long as the articulated vehicle is in a relatively straight configuration.

According to other aspects, the articulated vehicle comprises a further e-trailer and/or a self-powered dolly vehicle unit. The method then optionally comprises assisting S43 in reversing the articulated vehicle by applying steering by the further e-trailer 120 and/or the dolly to reduce a wheel slip angle associated with the wheels further e-trailer and/or the self-powered dolly vehicle unit, respectively, and preferably minimizing the wheel slip angle. In a similar manner, the method may comprise assisting S44 in reversing the articulated vehicle by applying torque by the further e-trailer 120 and/or by the dolly to reduce a coupling force magnitude at respective trailer or dolly rear coupling points 820, 830, and preferably minimizing the coupling force.

Figures 10, 11:
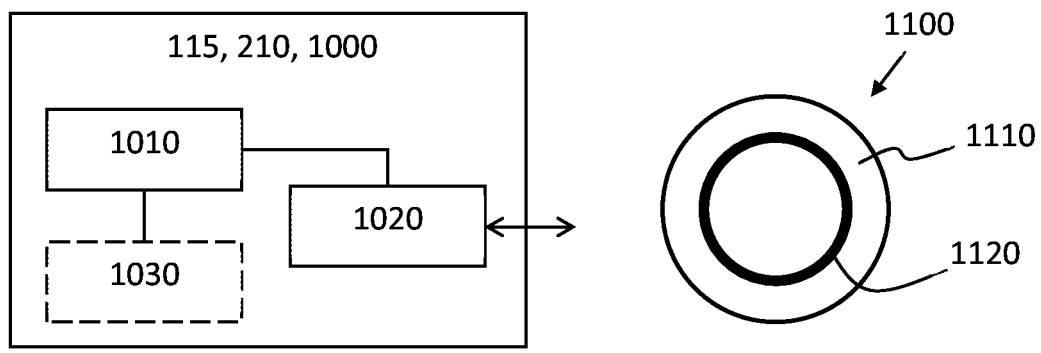
FIG. 10 schematically illustrates a control unit.
FIG. 11 shows an example computer program product.

FIG. 10 schematically illustrates, in terms of a number of functional units, the components of a control unit 115, 210, 1000 according to embodiments of the discussions herein. This control unit may be comprised in the vehicle 100, e.g., in the form of a VMM unit. Processing circuitry 1010 is provided using any combination of one or more of a suitable central processing unit CPU, multiprocessor, microcontroller, digital signal processor DSP, etc., capable of executing software instructions stored in a computer program product, e.g., in the form of a storage medium 1030. The processing circuitry 1010 may further be provided as at least one application specific integrated circuit ASIC, or field programmable gate array FPGA.

Particularly, the processing circuitry 1010 is configured to cause the control unit 1000 to perform a set of operations, or steps, such as the methods discussed in connection to FIG. 9. For example, the storage medium 1030 may store the set of operations, and the processing circuitry 1010 may be configured to retrieve the set of operations from the storage medium 1030 to cause the control unit 900 to perform the set of operations. The set of operations may be provided as a set of executable instructions. Thus, the processing circuitry 1010 is thereby arranged to execute methods as herein disclosed. In particular, there is disclosed a control unit 115, 210, 1000 for controlling reversal of an articulated vehicle 100, 300, 700, 800 comprising a tractor 110 and one or more towed vehicle units 120, 130, 140, 150, the control unit comprising processing circuitry 1010, an interface 1020 coupled to the processing circuitry 1010, and a memory 1030 coupled to the processing circuitry 1010, wherein the memory comprises machine readable computer program instructions that, when executed by the processing circuitry, causes the control unit to:

arrange S1 an electrified trailer, e-trailer, 200 comprising one or more electric machines, EM, 410 and a steering function 420 as a rearmost towed unit 130 of the articulated vehicle, obtain S2 a reversal command indicative of a desired reversal maneuver by the articulated vehicle 100, 300, 700, 800, configure S3 the e-trailer in a reverse towing mode of operation, in which mode the e-trailer is arranged to use the one or more EMs and the steering function to reverse according to the reversal command while towing the tractor 110 and any further trailer units 120, 140, 150 of the articulated vehicle, configure S4 the tractor 110 and the further trailer units 120, 140, 150 of the articulated vehicle in a passive towed mode of operation, in which mode the tractor 110 and the further trailer units 120, 140, 150 are arranged to be towed by the e-trailer, and reverse S5 the articulated vehicle 100, 300, 700, 800 by issuing the reversal command to the e-trailer.

The storage medium 1030 may also comprise persistent storage, which, for example, can be any single one or combination of magnetic memory, optical memory, solid state memory or even remotely mounted memory.

The control unit 900 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the control unit 900, e.g., by sending data and control signals to the interface 1020 and the storage medium 1030, by receiving data and reports from the interface 1020, and by retrieving data and instructions from the storage medium 1030. Other components, as well as the related functionality, of the control node are omitted in order not to obscure the concepts presented herein.

FIG. 11 illustrates a computer readable medium 1110 carrying a computer program comprising program code means 1120 for performing the methods illustrated in FIG. 9, when said program product is run on a computer. The computer readable medium and the code means may together form a computer program product 1100.

The invention claimed is:

1. A method for reversing an articulated vehicle comprising a tractor and one or more towed vehicle units, the method comprising:
    arranging an electrified trailer (e-trailer) comprising one or more electric machines (EM) and a steering function as a rearmost towed unit of the articulated vehicle,
    obtaining a reversal command indicative of a desired reversal maneuver by the articulated vehicle,
    configuring the e-trailer in a reverse towing mode of operation, wherein the e-trailer is arranged to use the one or more EMs and the steering function to reverse according to the reversal command while towing the tractor and any further trailer units of the articulated vehicle,
    configuring the tractor and the further trailer units of the articulated vehicle in a passive towed mode of operation, wherein the tractor and the further trailer units are arranged to be at least partially towed by the e-trailer, and
    reversing the articulated vehicle by issuing the reversal command to the e-trailer,
    wherein generating the reversal command is done based on manual control input obtained from a driver of the articulated vehicle.

2. The method of claim 1, performed by a vehicle control unit arranged (VCU) in the e-trailer.

3. The method of claim 1, performed by a VCU arranged in the tractor.

4. The method of claim 1, further comprising assisting in reversing the articulated vehicle by applying steering by the tractor to reduce a wheel slip angle associated with the wheels on the tractor, and preferably minimizing the wheel slip angle.

5. The method of claim 1, further comprising assisting in reversing the articulated vehicle by applying torque by the tractor to reduce a coupling force at a tractor coupling point, and preferably minimizing the coupling force.

6. The method of claim 1, wherein the articulated vehicle comprises a further e-trailer and/or a self-powered dolly vehicle unit, the method further comprising assisting in reversing the articulated vehicle by applying steering by the further e-trailer and/or the dolly to reduce a wheel slip angle associated with the wheels on the further e-trailer and/or the self-powered dolly vehicle unit, respectively, and preferably minimizing the wheel slip angle.

7. The method of claim 1, wherein the articulated vehicle further comprises a further e-trailer and/or a self-powered dolly vehicle unit, the method comprising assisting in reversing the articulated vehicle by applying torque by the further e-trailer and/or by the dolly to reduce a coupling force at respective trailer or dolly rear coupling points, and preferably minimizing the coupling force.

8. A computer program comprising program code means for performing the steps of claim 1 when the program is run on a computer or on processing circuitry of a control unit.

9. A control unit for controlling reversal of an articulated vehicle comprising a tractor and one or more towed vehicle units, the control unit comprising processing circuitry, an interface coupled to the processing circuitry, and a memory coupled to the processing circuitry, wherein the memory comprises machine readable computer program instructions that, when executed by the processing circuitry, cause the control unit to:
    arrange an electrified trailer (e-trailer) comprising one or more electric machines (EM) and a steering function as a rearmost towed unit of the articulated vehicle,
    obtain a reversal command indicative of a desired reversal maneuver by the articulated vehicle,
    configure the e-trailer in a reverse towing mode of operation, wherein the e-trailer is arranged to use the one or more EMs and the steering function to reverse according to the reversal command while towing the tractor and any further trailer units of the articulated vehicle,
    configure the tractor and the further trailer units of the articulated vehicle in a passive towed mode of operation, wherein the tractor and the further trailer units are arranged to be towed by the e-trailer, and
    reverse the articulated vehicle by issuing the reversal command to the e-trailer,
    wherein the reversal command is generated based on manual control input obtained from a driver of the articulated vehicle.

10. An electrified trailer (e-trailer) comprising:
    one or more electric machines (EM), and
    a steering function,
    wherein the e-trailer comprises:
        a vehicle control unit (VCU) arranged to control the e-trailer in a reverse towing mode of operation, and wherein the e-trailer is configured to use the one or more EMs and the steering function to reverse according to a reversal command, the reversal command being generated based on a manual control input from a driver of the articulated vehicle.

11. A tractor comprising:

a vehicle control unit (VCU) arranged to configure the tractor in a passive towed mode of operation, wherein the tractor is arranged to be towed by an electrified trailer (e-trailer), and wherein the VCU is arranged to control a steering angle to reduce a wheel slip angle associated with two or more steered wheels on the tractor when in the passive towed mode of operation.

* * * * *